United States Patent [19]
Ayres

[11] Patent Number: 5,317,119
[45] Date of Patent: May 31, 1994

[54] OVEN SAFE DISPOSABLE FOOD CONTAINER

[75] Inventor: John Ayres, Lapeer, Mich.

[73] Assignee: Nu-Tech & Engineering, Inc., Lapeer, Mich.

[21] Appl. No.: 870,489

[22] Filed: Apr. 16, 1992

Related U.S. Application Data

[60] Division of Ser. No. 517,204, May 1, 1990, Pat. No. 5,108,677, which is a continuation-in-part of Ser. No. 258,373, Oct. 17, 1988, Pat. No. 4,921,250.

[51] Int. Cl.$^5$ .............................................. H05B 6/80
[52] U.S. Cl. .................................. 219/734; 219/725; 99/DIG. 14; 426/113; 426/234; 426/243; 264/112; 340/624
[58] Field of Search ............... 219/10.55 E, 10.55 M, 219/10.55 F; 426/234, 243; 99/DIG. 14; 264/319, 330, DIG 39, DIG. 46, 43, 112; 273/362, 105.4; 106/38.51, 38.35, 197.2, 209, 214, 306; 260/23.3, 63 CQ, 23 H; 229/3.5 R; 340/624

[56] References Cited

U.S. PATENT DOCUMENTS

| | | | |
|---|---|---|---|
| 3,415,402 | 8/1966 | Webber | 229/3.5 |
| 3,654,064 | 4/1972 | Laumann | 260/23.3 |
| 3,676,401 | 7/1972 | Henry | 260/63 CQ |
| 3,689,611 | 9/1972 | Hardy et al. | 264/43 |
| 3,844,987 | 10/1974 | Clendinning et al. | 260/78.3 |
| 3,852,913 | 12/1974 | Clendinning et al. | 260/78.3 |
| 3,867,324 | 2/1975 | Clendinning et al. | 260/23 H |
| 3,932,319 | 1/1976 | Clendinning et al. | 260/7.5 |
| 4,060,508 | 11/1977 | Sugahara et al. | 106/306 |
| 4,080,213 | 3/1978 | Mori et al. | 106/38.35 |
| 4,124,550 | 11/1978 | Kobayashi et al. | 260/23.3 |
| 4,163,000 | 7/1979 | Kashima et al. | 106/38.35 |
| 4,191,320 | 3/1980 | Taylor et al. | 229/3.5 R |
| 4,337,116 | 6/1982 | Foster et al. | 162/158 |
| 4,391,833 | 7/1983 | Self et al. | 426/523 |
| 4,529,464 | 7/1985 | Jones | 156/244.24 |
| 4,567,877 | 2/1986 | Sepahpur | 126/246 |
| 4,568,087 | 2/1986 | Schreiner-Hansen | 273/362 |
| 4,623,150 | 11/1986 | Moehlman et al. | 273/362 |
| 4,641,005 | 2/1987 | Seidferth | 219/10.55 E |
| 4,699,725 | 10/1987 | Gancy | 252/70 |
| 4,709,808 | 12/1987 | Balduff et al. | 206/158 |
| 4,757,940 | 7/1988 | Quick et al. | 229/3.5 R |
| 4,808,780 | 2/1989 | Seaborne | 219/10.55 E |
| 4,814,012 | 3/1989 | Paul et al. | 106/38.51 |
| 4,851,821 | 7/1989 | Howard et al. | 340/624 |
| 4,877,932 | 10/1989 | Bernstein et al. | 219/10.55 E |
| 4,890,439 | 1/1990 | Smart et al. | 53/410 |
| 4,894,503 | 1/1990 | Wendt | 219/10.55 E |
| 4,916,280 | 4/1990 | Havette | 219/10.55 E |
| 5,026,958 | 6/1991 | Palacios | 219/10.55 E |
| 5,028,461 | 7/1991 | Nakamichi | 428/34.5 |
| 5,052,369 | 10/1991 | Johnson | 126/400 |
| 5,108,677 | 4/1992 | Ayres | 264/112 |

*Primary Examiner*—Bruce A. Reynolds
*Assistant Examiner*—Tu Hoang
*Attorney, Agent, or Firm*—Brooks & Kushman

[57] ABSTRACT

A disposable food container formed of sand and a decomposable binder. The disposable food containers are suitable for holding, storing and exposing food to heat in both conventional and microwave ovens. The decomposable binders contain 20 to 40% by weight of a binder selected from the group consisting of starch, grain flours and mixtures thereof, 20 to 30% by weight salt, 1 to 3% by weight oil and water. The containers are covered with a coating to prevent the transmission or absorption of liquids.

13 Claims, 5 Drawing Sheets

OVEN SAFE DISPOSABLE FOOD CONTAINER

RELATED APPLICATIONS

This is a divisional of copending application Ser. No. 07/517,204 filed on May 1, 1990, issued as U.S. Pat. No. 5,108,677, which was a continuation-in-part of Ser. No. 07/258,373 filed on Oct. 17, 1988, which issued as U.S. Pat. No. 4,921,250.

FIELD OF INVENTION

This invention relates to biodegradable articles formed of sand and more particularly to sand-based articles formed using a decomposable binder and methods for forming same.

BACKGROUND

The use of plastic as a container for food sold both in fast food restaurants and in the grocery store is increasing at an alarming rate. There is a great emphasis currently in recycling and minimizing non-biodegradable waste. However, due to the very low cost and the bulky size of plastic and styrofoam food containers, it is not practical to recycle the vast majority of plastic and styrofoam disposable food containers. There is, therefore, a great interest in utilizing food containers which are decomposable and inert in order to minimize the pollution problems resulting from the disposal of food containers in municipal land fills, incineration plants, or road side litter.

Over the years, there has been a significant amount of research to develop an environmentally acceptable disposable container as illustrated in the following patents:

| Patent No. | Inventor | Issue Date |
| --- | --- | --- |
| 3,415,402 | R. L. Webber | December 10, 1968 |
| 3,654,064 | D. H. E. Laumann | April 4, 1972 |
| 3,676,401 | J. W. Henry | July 11, 1972 |
| 3,844,987 | R. A. Clendinning et al | October 29, 1974 |
| 3,852,913 | R. A. Clendinning et al | December 10, 1974 |
| 3,867,324 | R. A. Clendinning et al | February 18, 1975 |
| 3,932,319 | R. A. Clendinning et al | January 13, 1976 |
| 4,191,320 | L. J. Taylor et al | March 4, 1980 |
| 4,641,005 | O. E. Seiferth | February 3, 1987 |
| 4,709,808 | D. C. Balduff et al | December 1, 1987 |

These food container patents use a variety of decomposable materials such as various decomposable organic compounds, paperboard, and other biodegradable filler material. While the above listed patents disclose containers which attempt to solve the existing environmental problem, there is yet to be a commercially feasible biodegradable container developed which is competitive from a cost, mechanical structure and consumer acceptance standpoint with the plastics and styrofoam generally used today.

In addition to the environmental problems associated with the disposal of food containers, a problem exists on a smaller scale in disposing of used frangible targets. Frangible targets are commonly used in skeet and trap shooting and are referred to as clay pigeons. Typical clay pigeons are formed of a mixture of a lime based chalk and a pitch, phenyl-resinous bitumen. Broken clay pigeons pose environmental problems as they are not readily decomposable and may be toxic if eaten by animals. Recognizing the environmental problems, there have been efforts in the past to develop non-toxic frangible targets as shown in U.S. Pat. Nos. 4,124,550 and 4,568,087. None of these targets have been readily accepted in the commercial marketplace.

Frangible targets, in order to be competitive in the commercial marketplace, need to be formed of inexpensive materials and exhibit consistent fracture characteristics. Where the targets are to be thrown such as in trap and skeet, it is very important that the targets weight and flight characteristics be consistent as well. It is therefore important that targets should absorb as little moisture as possible as moisture tends to affect both the weight and frangibility.

While frangible targets are quite common, frangible projectiles are virtually unknown. Projectiles for firearms, BB guns, pellet guns and slingshots are typically formed of metal such as lead, copper or steel and in the case of slingshots, glass. The common characteristics of these projectiles is that they tend to ricochet. The ricochet problem is most troublesome when shooting in a confined area. Shooting a BB gun or a slingshot indoors can be particularly dangerous if a stray shot hits a solid object. While lead projectiles have less of a propensity to ricochet particularly at acute angles, lead is expensive and poses environmental hazards.

OBJECTS, FEATURES AND ADVANTAGES OF THE INVENTION

It is an object of the present invention is to provide a method for forming a sand based article having a biodegradable binder for use in a variety of disposable articles.

It is an object of the present invention to provide disposable sand based food containers having a non-toxic biodegradable binder which will rapidly break down once the container has been discarded.

It is an object of the present invention to provide a frangible article for use as a target or a projectile which is biodegradable and non-toxic.

It is also another object of the invention to provide a frangible article with consistent frangibility and resistance to moisture absorption.

Yet another object of the present invention is to provide a projectile suitable for slingshots and the like which can be used indoors without fear of ricocheting.

An advantage of the present invention is that low cost inert or biodegradable materials are used to form the frangible article and consistent frangibility characteristics are achieved thereby.

SUMMARY OF INVENTION

A method of forming a biodegradable article is provided comprising these steps of mixing sand and a decomposable binder together to form a dough-like consistency. The dough-like mix is formed into a sheet and cut into a series of silhouette shapes. In the preferred method, these shapes are formed into three-dimensional objects which are dried to form a rigid, durable article for use as a food container or the like. Preferably, the article is coated with a water resistant sealant to prevent moisture absorption prior to disposal.

A frangible article has been developed for use as a target or a projectile using a mixture of sand and a decomposable binder. The sand binder mixture can be formed as desired and cured to create a rigid, durable article which will fracture into a plurality of dull pieces upon impact. A preferred composition of the binder is a mixture by weight of 20–60% grain flour, 15–30% salt, $\frac{1}{2}$–5% petroleum distillate and water.

One embodiment of the invention is a frangible silhouette target formed by mixing of the sand and binder into a dough-like consistency, forming the dough-like mix into a sheet, cutting a series of silhouette shapes and drying the shapes to form rigid, durable targets. Preferably, the target is then coated with a sealant to prevent moisture absorption.

Another alternative embodiment of the invention is a projectile formed of a frangible sand decomposable binder mixture. The projectile is rigid and durable and consistently fractures into a plurality of dull pieces upon impact. The projectile has particularly utility for use as slingshot ammunition.

These objects and novel characteristics of the invention will become further apparent from a review of the accompanying drawings and detailed description of the preferred embodiment.

BRIEF DESCRIPTION OF THE PREFERRED EMBODIMENT

Frangible Article

Referring generally to the drawings, a number of alternative embodiments of a frangible article for use as a target or a projectile are shown. FIGS. 1–7 and 10 show various silhouette targets designed for use with BB, pellet or small caliber guns. The targets are highly frangible and fracture upon impact by a projectile. The target fragments are biodegradable and alleviate the environmental problems posed by many other frangible targets.

A preferred target composition is a mixture of clean screened sand and an organic grain base binder. The sand when mixed with a binder forms a dough-like mix which can then formed into various shapes and dried in an oven. The preferred sand is screened to remove both large and small granules. Preferably, the sand will be screened to remove substantially all of the granules outside of the 0.1 to 0.5 millimeter grain size range. The grain size is determined optically measuring the maximum cordal length of the grain. Sand outside of the range will work, however, very fine sand causes drying time to be unnecessarily long and the use of coarse sand results in a crumbly mixture which is difficult to process.

An example of a preferred binder is a mixture by weight of: 20–60% grain flour, 5–30% salt, $\frac{1}{2}$–5% lubricant and water. Preferably, fungicide such as borax which would also be included representing approximately 1 to 2% by weight of the binder mixture. A drying agent such as alum or the like may also be added to improve the workability and texture of the binder mixture. The binder and sand are mixed together in sufficient quantities to achieve a dough-like mixture. Sufficient binder must be added so that the mixture is not too crumbly and sufficient sand must be present to minimize the drying time and the amount of shrinkage. Wheat flour is preferred for cost reasons but other grain flours or starches work satisfactorily. A light oil such as petroleum distillate or vegetable oil preferably acts as the lubricant and prevents the mixture from becoming sticky. Kerosene or other light petroleum distillates satisfactorily perform this function. The preferred salt has the grain size of table salt so as to quickly dissolve.

Once the sand and binder have been blended together, it is next formed into sheets using conventional rolling or extruding techniques. The sheet is then cut-up using a die or the like to create target preforms. The process is somewhat similar to making cookies with a cookie cutter. The shaped preforms are then dried using conventional convection oven batch or conveyor design. Alternatively, the preforms may be dried in a hot press operation where a heated die set will not only dry the preform but impart shape thereto. Other drying techniques are also possible such as dielectric heating. Care should be taken so that the drying rate is sufficiently slow to enable moisture to escape from the drying article without forming internal steam pockets which would fracture or weaken the article.

Once dried and cooled, the targets may be handled. The finished targets will be hard and durable but will readily fracture upon impact. The targets, however, are susceptible to moisture absorption and should be treated with a sealant. The targets in their natural state will be the color of sand. To prevent moisture absorption, the targets are preferably coated with a biodegradable sealant such as wax or the like. Varnish or non-toxic paint can also be used to seal the target. Sealants could be omitted, however, if the targets were packaged in small plastic bags to keep them dry such as used in the food packaging industry.

Figures 9, 10:
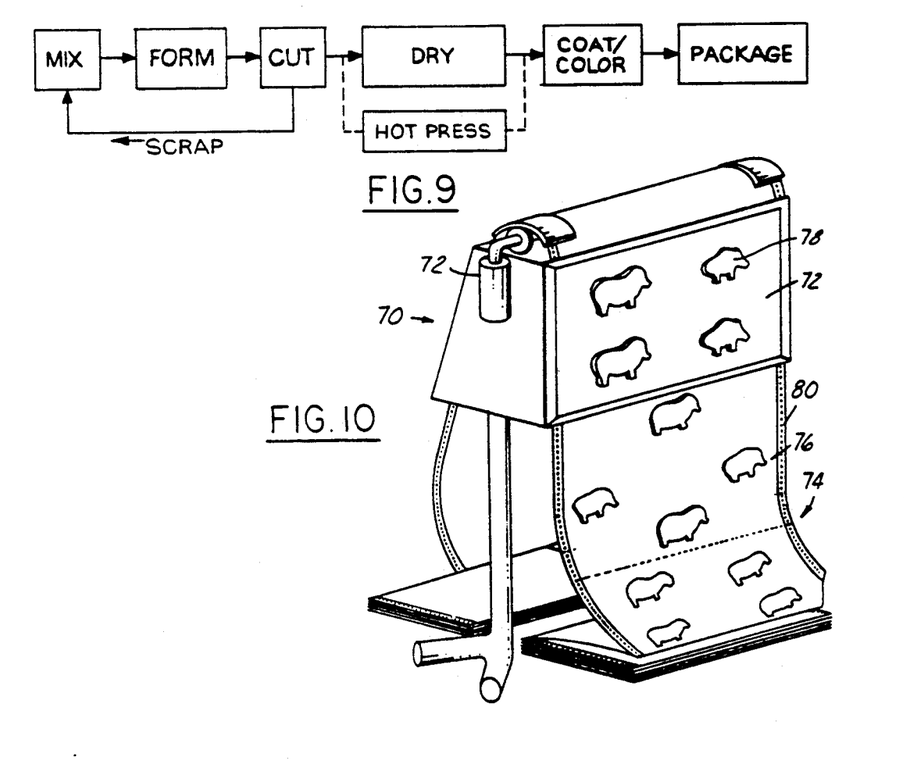
FIG. 9 is a block diagram showing a method of manufacturing frangible articles.
FIG. 10 is a perspective view of a alternative embodiment of the invention showing frangible targets mounted on fan-fold paper used in conjunction with a bullet trap having an automatic target advance mechanism.

In order to enhance the target visibility, at least one side of the silhouette target should be painted. After the coloring and sealing steps is completed the targets can then be packaged. The general method of forming the targets is shown in FIG. 9. While the steps are shown in their preferred sequence, it should be noted that the sequence may not be performed in order and, for example, the coloring step may take place prior to drying. The scrap resulting from the preformed cutting operation can be recycled by adding the scraps to the new mixture being formed.

A second example of a preferred binder is a mixture by weight of 20-60% grain starch, 5-30% flour, ½-5% petroleum distillate and water. Like the first example, fungicide and drying agent can be added to reduce bacterial growth and enhance workability. The resulting frangible article made using the second binder example similarly exhibits excellent durability and fracture characteristics. The preferred starch is corn starch but other grain starches perform adequately.

Figures 1, 4:
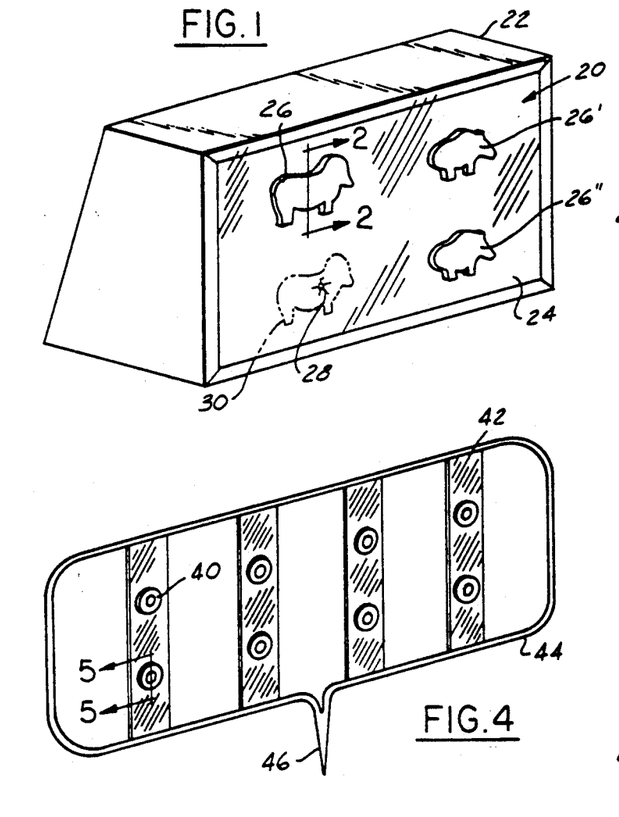
FIG. 1 is a perspective view of a sheet target mounted on a pellet trap having a plurality of frangible silhouettes affixed thereto.
FIG. 4 is a perspective view of yet another embodiment of the invention.
Figure 2:
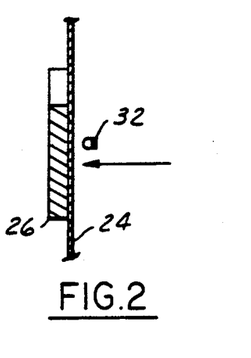
FIG. 2 is a cross-sectional view taken along lines 2—2 in FIG. 1.

Several examples of targets utilizing a frangible sand and decomposable binder mixtures are shown in the drawings. FIG. 1 shows a target 20 mounted in a bullet trap 22. Target 20 is formed of a clear plastic film 24 having bonded thereto a series of frangible silhouettes 26, 26′ and 26″. The lower left silhouette has been shot from the target by a projectile which entered through bullet hole 28. In the preferred embodiment shown, the outline of the silhouette is shown by imprint 30 enabling the shooter to determine the relative position of the bullet hole to the silhouette. As shown in FIG. 2 cross-section, the silhouettes 26 are located on the inside of plastic film 24. Plastic film 24 not only serves as a means for vertically supporting the frangible targets but it also prevents target fragments from being thrown back toward the shooter. The film also serves an important function of recording the bullet location relative to the silhouette. When shooting at typical metallic silhouettes or other frangible articles, only a hit or a miss is recorded and the shooter has little opportunity to learn where the bullet went. The target shown in FIG. 1 combines the advantages of shooting paper targets with the fun and excitement of shooting frangible articles without any of the safety and environmental problems associated therewith.

Figure 3:
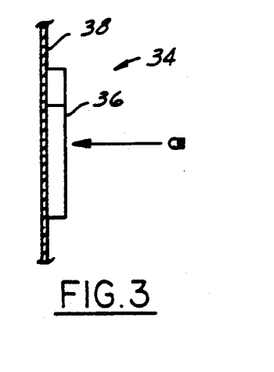
FIG. 3 is a cross-sectional side view of an alternative embodiment of the invention.

An alternative target 34 is shown in FIG. 3. Target 34 utilizes a silhouette 36 bonded to the front surface of a sheet 38. Sheet 38 can be formed of paper or other material such as plastic or the like. Use of paper as a supporting sheet enables background graphics to be used in conjunction with the silhouette. The backing, however, no longer serves to contain target fragments and bullet holes are no longer clean as a result of the target fragments being pushed through the support sheet upon impact.

Figure 5:
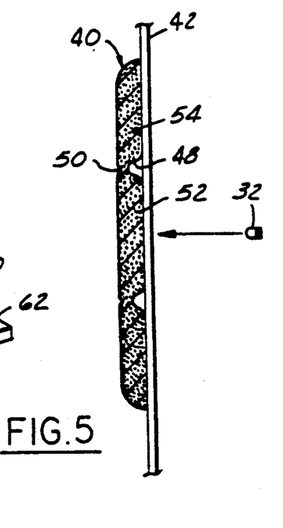
FIG. 5 is a cross-sectional side view taken along lines 5—5 in FIG. 4.

The frangibility of the silhouette can be varied as desired by controlling the silhouette shape, thickness and composition. To control the fracture pattern, it is also possible to score the target surface to encourage fractures to occur along a pre-established line. FIG. 4 and FIG. 5 show an alternative embodiment of the invention. A plurality of frangible silhouette disks 40 are suspended on a thin sheet 42 held in a wire frame 44. Wire frame 44 is provided with a central stake section 46 to enable the frame to be placed in the ground for outdoor shooting. Film 42 is preferably a wide band of clear plastic tape to which the frangible disks 40 are attached by the user. As the disks are shot, new disks can be added and the tape need only be replaced infrequently when it becomes too badly torn or it loses adhesive characteristics.

As shown in FIG. 5, the disks are preferably positioned on the inside of the tape relative to pellet 32 so that minimal damage is done to the tape as a result of the impact. The target disk 40 is scored by concentric grooves 48 and 50 opposite the sides of the target. The grooves 48 and 50 which score the target disk serve to control the target fracture pattern. Groove 48 divides the disk into two regions, a central circular bulls-eye 52 and a surrounding circumferential range 54. When pellet 32 strikes the bullseye 52, a fracture will occur along the root of groove 48 and a central bullseye portion of the target will be dislodged leaving circumferential ring 54 attached to film 42. When the pellet strikes a portion of the circumferential ring, the ring will fracture dislodging a portion of the ring leaving the bullseye in a semi-circular segment of the ring remaining. By utilizing grooves to score a frangible target, a break pattern can be controlled to increase the number of times a target can be shot and to add more fun and variety to target shooting.

Figure 6:
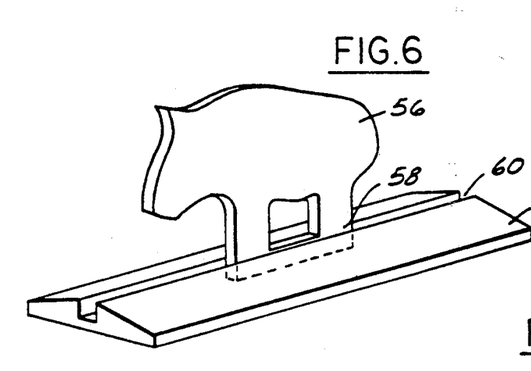
FIG. 6 is respective view of a silhouette target held by a free-standing base.
Figure 7:
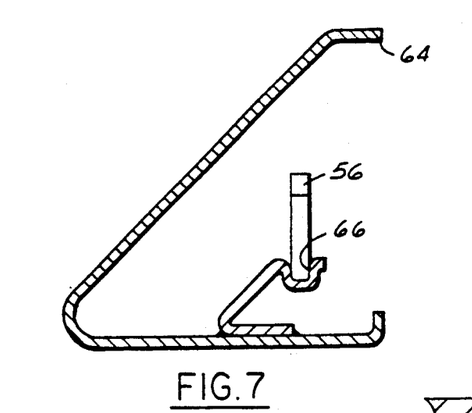
FIG. 7 is a cross-sectional side elevation of a bullet trap holding a frangible silhouette target.

Another embodiment of the invention is shown in FIGS. 6 and 7. A frangible silhouette target 56 is provided in the shape of an animal. A silhouette is a generally planar sheet having a lower marginal edge 58 sized to fit into groove 60 and base 62 shown in FIG. 6. Silhouette 56 can alternatively be supported in bullet trap 64 shown in FIG. 7 with the lower marginal edge of the silhouette being within a groove 66 sized to receive the silhouette. A free-standing base 62 shown in FIG. 6 is inexpensive and can be easily extruded from plastic and is ideal for outdoor shooting. The bullet trap embodiment shown in FIG. 7 represents a possible structure for vertically supporting a frangible target for indoor usage. It should be appreciated that numerous base or support structures can be fabricated to temporarily support a frangible target and FIGS. 6 and 7 merely illustrate two preferred embodiments.

An alternative embodiment of the invention is adapted for use with an automatic target feeder as shown in FIG. 10. Bullet trap 70 is provided with a motorized target advance mechanism 72 for automatically changing the target. The target 74 consists of a plurality of fan-fold pages 76 having frangible silhouettes 78 bonded thereto. The fan-fold pages 76 are provided with perforated marginal edges 79 for cooperation with the motor advance mechanism. After the targets in front of the bullet trap have been shot, the user can activate the motor advance mechanism to advance the target 74 to the next page 76 having a new set of silhouettes contained thereon. The silhouettes preferably stagger from page to page to minimize the height of the folded target pages.

While the targets shown are of the silhouette type, it should be appreciated that flying targets such as clay pigeons can be fabricated using the previously described method and compositions. Clay pigeons would be best made using a hot pressing method to shape and dry the preform.

Figure 8:
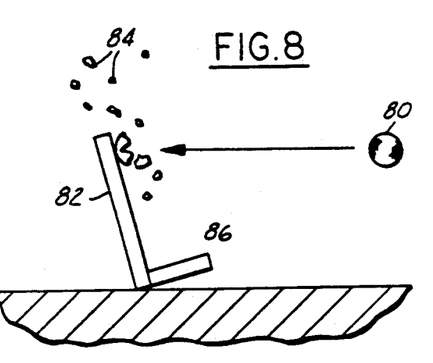
FIG. 8 is a side view representing a frangible projectile striking the metallic silhouette.

An embodiment of the invention for use as a frangible projectile is shown in FIG. 8. Spherical projectile 8 is illustrated immediately before and immediately after impact with silhouette 82. Upon impact with the silhouette, the projectile fractures into a plurality of dull pieces 84. The silhouette is provided with a base 86 to support the silhouette in a generally upright position to allow the silhouette to topple over upon being struck by a projectile. The projectile shown is adapted to be used as slingshot ammunition. The preferred sphere size is within the range of 6-20 millimeters in diameter.

Spherical projectile 80 is formed by a frangible composition of sand and decomposable binder to provide a rigid, durable projectile which can readily withstand the forces extended thereon while being shot from a slingshot. Upon impact with a rigid object, the projectile fractures into dull pieces which do not pose an environmental hazard and readily decay when exposed to the elements of outdoors. The projectile is preferably formed of the compositions previously described and is provided with a sealant to prevent moisture absorption. It is also advantageous to color the projectiles to enhance the visibility of the projectile in flight. A fluorescent yellow or orange color enables the flight of the projectile to be tracked both against dark and light backgrounds and significantly improves the shooters ability to observe the path of the high speed projectile. Projectiles of the present embodiment can also be used in other applications such as in firearms, however, the sealant or protective layer needs to be applied to the projectile to prevent the sand from scoring the bore of the gun.

Method Of Forming A Sand Based Article Having A Decomposable Binder

Figure 11:
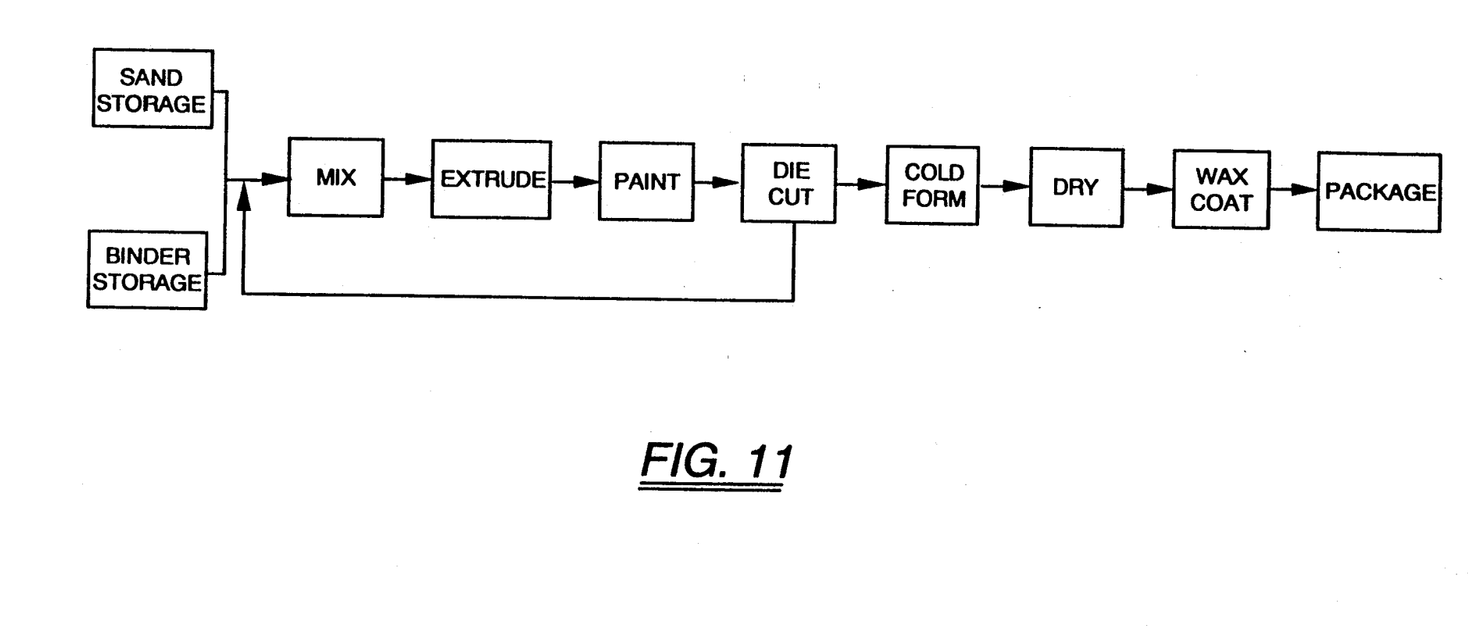
FIG. 11 is block diagram illustrating a method of manufacturing a three-dimensional sand based article having a biodegradable filler.
Figure 13:
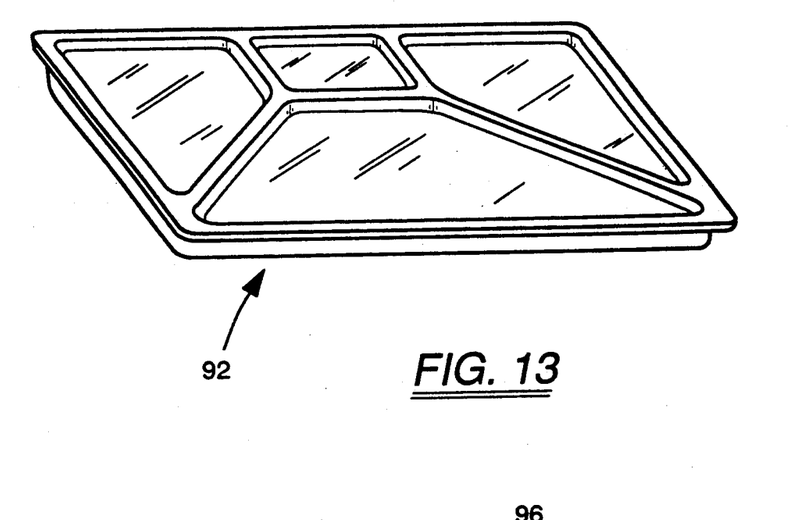
FIG. 13 is a perspective view of a multi-compartment food tray formed utilizing the present invention.

The method utilized for forming a sand based article having a decomposable binder is illustrated in the block diagrams of FIGS. 9, 11, and 13. In FIG. 9, a preferred method of forming a frangible article such as the previously described targets is illustrated. In the mixing step, sand of a selected size and the decomposable binder are mixed. Preferably, sand and the binder will be stored separately for ease of handling and mixed on an as needed basis prior to forming. Once the sand binder mixture is thoroughly and uniformly mixed, it is fed into a forming operation. The preferred forming operation is to extrude the mixture into thin continuous sheets. A pump feeder using an auger type screw and a stainless steel extrusion head is the preferred mechanism for forming the sand binder mixture into a continuous thin sheet. A DOERING® pump feeder manufactured by C. Doering & Sons, Inc., 644 Blackhawk Drive, West Mott, Ill. 60559 is specifically designed to extrude heavy viscous products. The DOERING® pump feeder is illustrated in the DOERING® pump feeders brochure "Engineered to Pump the Unpumpables" (undated, circa 1989) which is incorporated by reference herein. The extruded sheet is transported generally horizontally on a conventional belt conveyor to a cutting station where the sand binder mixture is cut into silhouette shaped preforms. The excess scrap material is then returned to the mixing station.

The preforms can be dried in a batch or continuous oven or dried and formed simultaneously using a hot press. Once dried, a color and sealant coat is then applied. Preferably, the color coat, such as a latex paint or the like, and the sealant, such as powder or spray wax, is applied while the article is still hot so that the paint and sealant rapidly dry. The finished articles are then packaged for shipment.

The method illustrated in FIG. 11 for forming containers for food or the like is very similar to the method utilized to form frangible targets. Sand and the appropriate decomposable binder are mixed. Mixing can be done in a conventional bread dough mixing machine provided that the bowl and paddle are formed of a wear resistant material, such as high nickel stainless steel, to minimize wear. The thoroughly homogenous mixture is then fed into the pump/extruding machine to form a continuous thin sheet. In the FIG. 11 embodiment method, painting is done relatively early in the process. It should be appreciated, however, that painting can be done at any time subsequent to the extrusion of the sheet. In the embodiment and method illustrated in FIG. 11, the painted sheet is then cut and the excess materials are returned to the mixing station. The die cut preforms are then cold formed to give the preforms a three-dimensional shape. If forming is not complex, such as in the case of a simple plate forming can be done utilizing a sag operation. More complex or deeply formed articles are formed using a matching male and female forming die. The articles once formed are dried and a sealant of wax or the like is applied to the dried parts prior to packaging. In instances where containers are to be used at high temperatures, such as frozen food items in microwaveable dishes, a high melting temperature wax/polyethylene blend should be utilized. Polyethylene coatings for high temperature use are sold under the trademark POLYWAX® by Petrolight Corporation of Chicago, Ill. as illustrated in "POLYWAX® polyethylenes", product data brochure release no. BP 100, November, 1981 and "Development Product Data Ploywax® 4000: (data sheet P-1030 1980–1984) which are incorporated by reference herein. Preferably, the wax like sealant will have a melting point above 212° F. For lower temperature application, a less expensive sealant such as a paraffin/polyethylene blend can be used.

Figure 12:
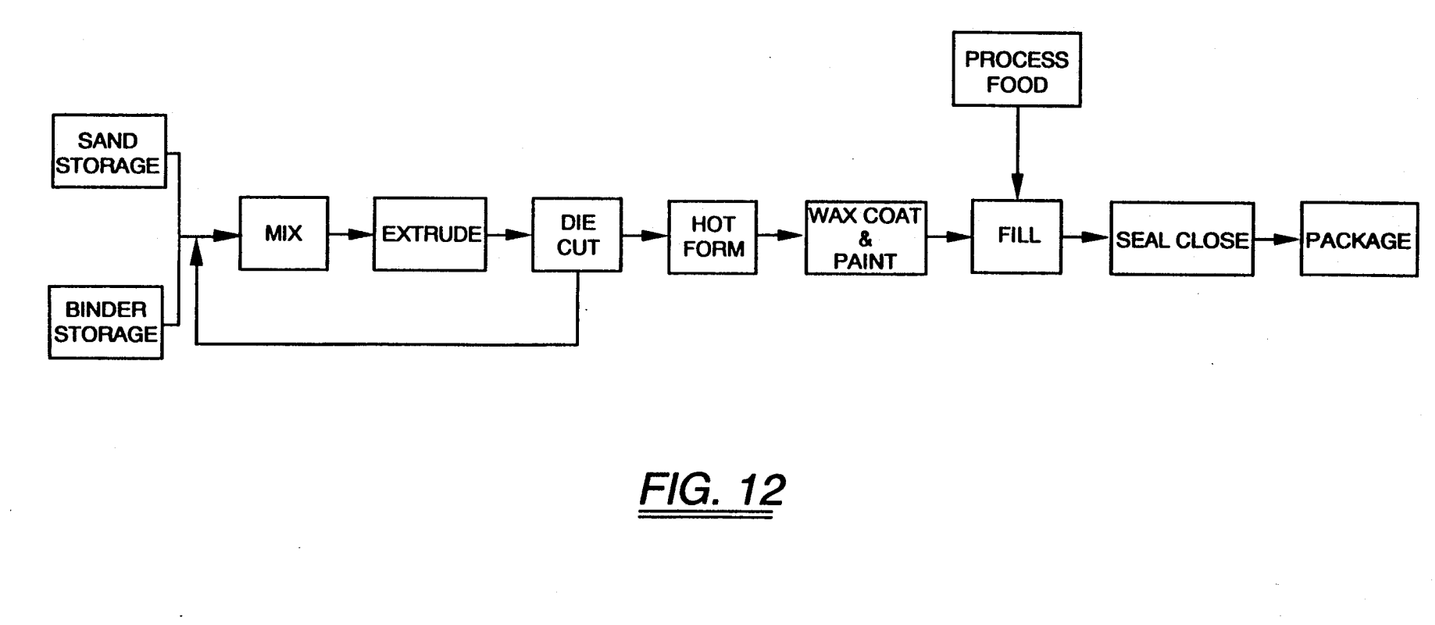
FIG. 12 is a block diagram illustrating a method of forming and filling sand based containers having a biodegradable binder for use in food packaging.

In the method illustrated in FIG. 12, containers are formed and filled with the food product and finished package ready for sale in the grocery store in a single continuous operation. Continuous method of this type minimizes the shipping, storing, and handling problems typically associated with providing of containers to a food packaging operation. Utilizing this method raw materials for the container, i.e. the sand and decomposable binder, may be stored at the food processing plant as a basic raw material. Containers can then be manufactured as needed without the problems associated with ordering, fabricating, shipping, and containers for inventory to suit all of the various products manufactured in a single food processing plant.

Figures 14, 15:
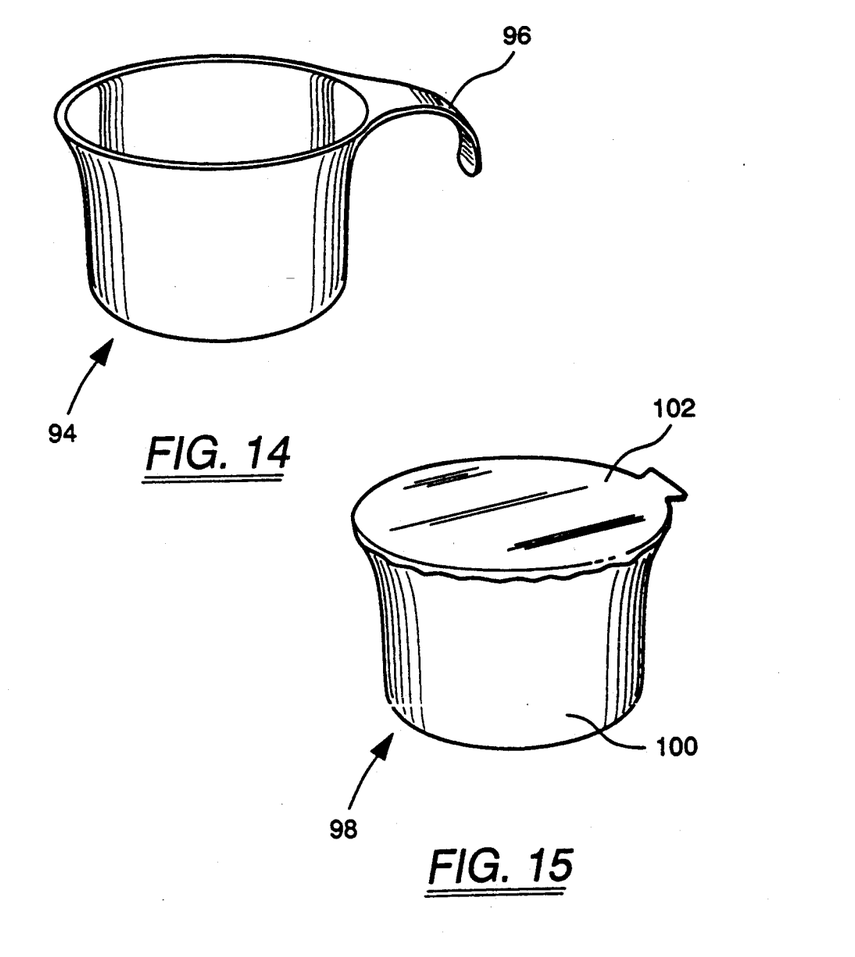
FIG. 14 is a cup-like container formed utilizing the present invention.
FIG. 15 is a perspective view of a filled food container formed utilizing the present invention.

FIGS. 13, 14, and 15 illustrate various containers which can be formed utilizing the previously described methods. In FIG. 13, a multi-compartment tray 92 is illustrated. By utilizing a high temperature coating, trays of this type can be heated in a convection or microwave oven. A disposable cup manufactured in accordance with the present invention is illustrated in FIG. 14. The cup 94 is a relatively deep drawn part formed from a flat preform. Handle portion 96 is not a closed loop thereby enabling cups to be stacked one upon another in a nested arrangement with the handles rotated slightly so as to prevent interference. Cups of this type can be utilized with both hot and cold beverages provided a suitable heat range sealant is utilized.

FIG. 15 illustrates a food container 98 of the aseptic design. Containers of this type are commonly used for pudding and applesauce or the like. Processed food is placed in a sterile container (traditionally plastic) and a foil seal is affixed to the mouth of the container. Utilizing the present invention, a cup-shaped container 100 is formed of sand and a decomposable binder coated with a wax-like sealant. The sealant not only renders the container watertight but prevents oxygen from permeating the container wall. Once the container is filled with the processed food, a lid 102 is sealingly affixed to the periphery of the container mouth to totally seal the processed food therein. While a traditional foil-type lid could be used, ideally a lid formed of coated paper or other biodegradable material will be utilized.

One should appreciate that the present method can be used to create a wide variety of articles which are ideally suited for disposable food containers. One should also appreciate the excellent structural integrity of articles formed utilizing the present invention. Other applications, such as non-sterile food trays and disposable parts currently made of plastic or paperboard, can be manufactured using this method.

Food Container Composition

The food containers illustrated in FIGS. 13-15 are preferably made of a slightly different composition than the frangible article described previously. Since food containers are not designed to easily fracture a composition having greater strength and toughness is preferred. A preferred sand grain size for maximum strength and surface quality is slightly less than the granule size used for the frangible articles described previously. The preferred granule size is in the 0.08 to 0.3 millimeter grain size range. Finer sand will work, however, drying time tends to become needlessly long. Coarser sand will result in a crumbly mixture which is more difficult to form into complex shapes.

The preferred binder for use in containers is a mixture by weight of 20%-40% corn starch, 20%-30% salt, 1%-3% mineral oil, 0.5%-3% alum with the balance being water. The following specific composition has been determined to work quite well: 30% corn starch, 24% salt, 2% mineral oil, 1.4% alum, 0.6% non-toxic powder poster paint and the balance being water. The alum which acts as a drying agent as previously described is advantageous but not necessary.

In order to assure adequate mixing of the binder constituents, all of the ingredients with the exception of the starch are first mixed together, then the starch is slowly added while mixing continuously to form a homogeneous mixture without lumps. The sand binder mixture is then formed in patches with a suitable amount of binder added to the sand to achieve a heavy dough-like consistency. The amount of binder required will vary with sand grain size, the finer the sand, the more binder necessary. In addition to using the starch based binders, grain flour binders similar to frangible article or the combination starch and grain flour binders can also be utilized for forming sand base containers having a decomposable binder.

It should be understood of course that while the invention herein shown and described constitutes a preferred embodiment of the invention, it is not intended to illustrate all possible forms thereof. A variety of articles of varying shapes or compositions can be created by one of ordinary skill in the art without departing from the spirit and scope of the invention disclosed and claimed.

What is claimed is:

1. A disposable container for holding, storing, and exposing food to heat, which is capable of use in microwave ovens, comprising:
    a body comprised of sand granules having an average granule size of 0.08 to 0.5 millimeters, mixed with a decomposable binder, wherein the binder holds the granules of sand together to form a shape capable of receiving food: and
    a coating covering at least a portion of the body wherein the coating prevents the passage of moisture therethrough, and makes the body capable of holding, storing and exposing food to heat.

2. The disposable container of claim 1 wherein the sand has an average granule size of from 0.08 to 0.3 millimeters.

3. The disposable container of claim 1 wherein the decomposable binder comprises:
    20-60% by weight of a binder selected from the group consisting of starch, grain flours and mixtures thereof;
    20-30% by weight salt;
    1-3% by weight oil; and
    water.

4. The disposable container of claim 3 wherein the starch is derived from corn.

5. The disposable container of claim 3 wherein the decomposable binder further contains 0.5-3.0% by weight alum.

6. The disposable container of claim 1 which further comprises a lid cooperating with a body to cover a food contained therein.

7. The disposable container of claim 6 which is aseptic.

8. The disposable container of claim 1 wherein the coating is selected from the group consisting of polyethylene, wax, paraffin, and mixtures thereof.

9. The disposable container of claim 8 wherein the coating has a melting temperature above 212 degrees Fahrenheit.

10. The disposable container of claim 8 wherein the coating substantially encompasses the body and effectively renders the body impermeable to water and oxygen.

11. A disposable food container comprising: a body formed of:
    sand having an average grain size from 0.08 to 0.3 millimeters; and
    a decomposable binder comprising 25-35% by weight corn starch, 20-25% by weight salt, 1.0-2.0% by weight alum, 1-3% by weight oil, and water;
    said body having a shape capable of receiving food; and
    a coating selected from the group consisting of polyethylene, wax, paraffin, and mixtures thereof, said coating substantially encompassing the body.

12. The disposable food container of claim 11 wherein the coating has a melting temperature above 212 degrees Fahrenheit to allow use of the container in microwave and conventional ovens.

13. The disposable food container of claim 11 wherein the decomposable binder further comprises a coloring agent.

* * * * *